United States Patent [19]

Semba et al.

[11] Patent Number: 4,528,867
[45] Date of Patent: Jul. 16, 1985

[54] TRANSMISSION CASE FOR TRACTORS

[75] Inventors: Hideo Semba; Toshio Hori; Noboru Sagawa; Ryota Nagano, all of Matsuyama, Japan

[73] Assignee: Iseki & Co., Ltd., Matsuyama, Japan

[21] Appl. No.: 417,334

[22] Filed: Sep. 13, 1982

[51] Int. Cl.³ .......................... F16H 57/02; F16H 3/08
[52] U.S. Cl. ..................................... 74/606 R; 74/359
[58] Field of Search ...................... 74/606 R, 359, 745

[56] References Cited

U.S. PATENT DOCUMENTS

| 3,082,645 | 3/1963 | Chiarello | 74/606 R |
| 3,099,166 | 7/1963 | Schou | 74/359 |
| 3,173,303 | 3/1965 | Galaniuk | 74/359 |
| 4,273,001 | 6/1981 | Miyahara et al. | 74/359 |
| 4,365,523 | 12/1982 | Numazawa et al. | 74/359 |

FOREIGN PATENT DOCUMENTS 631129 11/1961 Canada ............................. 74/606

Primary Examiner—Kenneth J. Dorner
Assistant Examiner—Vinh Luong
Attorney, Agent, or Firm—Arthur T. Fattibene

[57] ABSTRACT

A transmission case for tractors consists of three parts, a front transmission case, a rear transmission case and a spacer transmission case, the spacer transmission case having a mounting flange around its outer periphery. The front and rear transmission cases are securely mounted to the mounting flange of the spacer transmission case so that the spacer transmission case is contained in either or both of the front and rear transmission cases thereby minimizing the entire length of the transmission case. The transmission case is also characterized in that the spacer transmission case has an opening in the ceiling to enable easy access to the gear components installed in the spacer transmission case during assembling work and adjustment.

6 Claims, 8 Drawing Figures

TRANSMISSION CASE FOR TRACTORS

BACKGROUND OF THE INVENTION

The present invention relates to a transmission case for tractors.

Generally farm tractors are required to have a wide range of traveling speed. They must run at high speed while driving on the road and at very low speed while digging ditches on farm land. For example, large general purpose tractors are required to meet the multiple speed variation capability, resulting in an especially long transmission case which cannot be used commonly with small tractors that do not require such a multiple speed variation capability.

To overcome the above inconvenience there is available a transmission case which, as shown in FIG. 1, is divided into a front and a rear transmission case 1 and 2 and has a spacer transmission case 6 mounted between the front and rear cases with a first speed change gear 3 contained in the front transmission case, a second speed change gear 5 in the spacer transmission case and a third gear 4 in the rear transmission case. For the tractors that do not require the second speed change gear 5 only the front and rear transmission cases 1 and 2 are coupled with the spacer transmission case 6 omitted. Hence, in the tractors that use the transmission case as shown in FIG. 1, the entire length of the transmission case or wheel base will vary according to the number of speed change gears required. This is disadvantageous in the light of standardization. The transmission having the spacer transmission case 6 will inevitably be long in the entire length in contrast to the general requirement for smaller size.

In this type of transmission, a hydraulic cylinder 7 and a piston 8 are provided in the upper portion of the rear transmission 2 for hanging the cultivating tools with a lift arm 9 linked with the piston 8. The hydraulic cylinder assembly is installed in a recess 2a formed in the upper portion of the rear transmission case 2. To keep the entire length of the transmission case as small as possible, the rear transmission case 2 has to be reduced by as much length as the spacer transmission case 6. To satisfy the above requirement while securing the length of recess 2a necessary for accommodating the hydraulic cylinder assembly makes the size (L) of the mounting portion 10 measured from the front end 2b of the rear transmission case 2 to the front edge of the recess 2a become smaller. As a result when the rear transmission case 2 is mounted on the front transmission case 1 through the spacer transmission case 6, vibration will result during operation due to insufficient strength of the mounting portion 10.

SUMMARY OF THE INVENTION

To solve the above problems, the transmission of this invention is constructed as schematically shown in FIG. 2. The front transmission case 11 with the rear end open containing the first speed change gear 3 and the rear transmission case 12 with the front end open containing the third gear 4 are mounted to the flange 14 of the spacer transmission case 13 containing the second speed change gear 5 so that the spacer transmission case 13 is placed within either one or both the front and rear cases. With this construction the entire length of the transmission case which requires the spacer transmission can be kept as almost the same as those that do not have the spacer transmission. This makes it unnecessary to reduce the length of rear transmission case 12 insuring sufficient length of the recess 2a for accommodating the hydraulic cylinder assembly and the sufficient size L of the mounting portion 15. This in turn provides higher mechanical strength than can be obtained with conventional transmission case.

In the conventional ones, the transmission case has windows in the front and rear partition walls adjacent to the front and rear transmission case so that one can look into the transmission through these windows when assembling the speed change gears and shafts. However, since the size of the windows is made as small as possible to minimize the reduction in strength of the partition walls that support the gear shafts, the assembling work is extremely difficult and, in addition, the condition of meshing gears cannot be seen directly through the windows during the assembling work.

To eliminate this problem, this invention provides an opening 16 at the ceiling of the spacer transmission case 13 through which to insert the component members of the second speed change gear 5 into the spacer transmission case and check the condition of meshing gears.

DESCRIPTION OF THE PREFERRED EMBODIMENT

Figure 4:
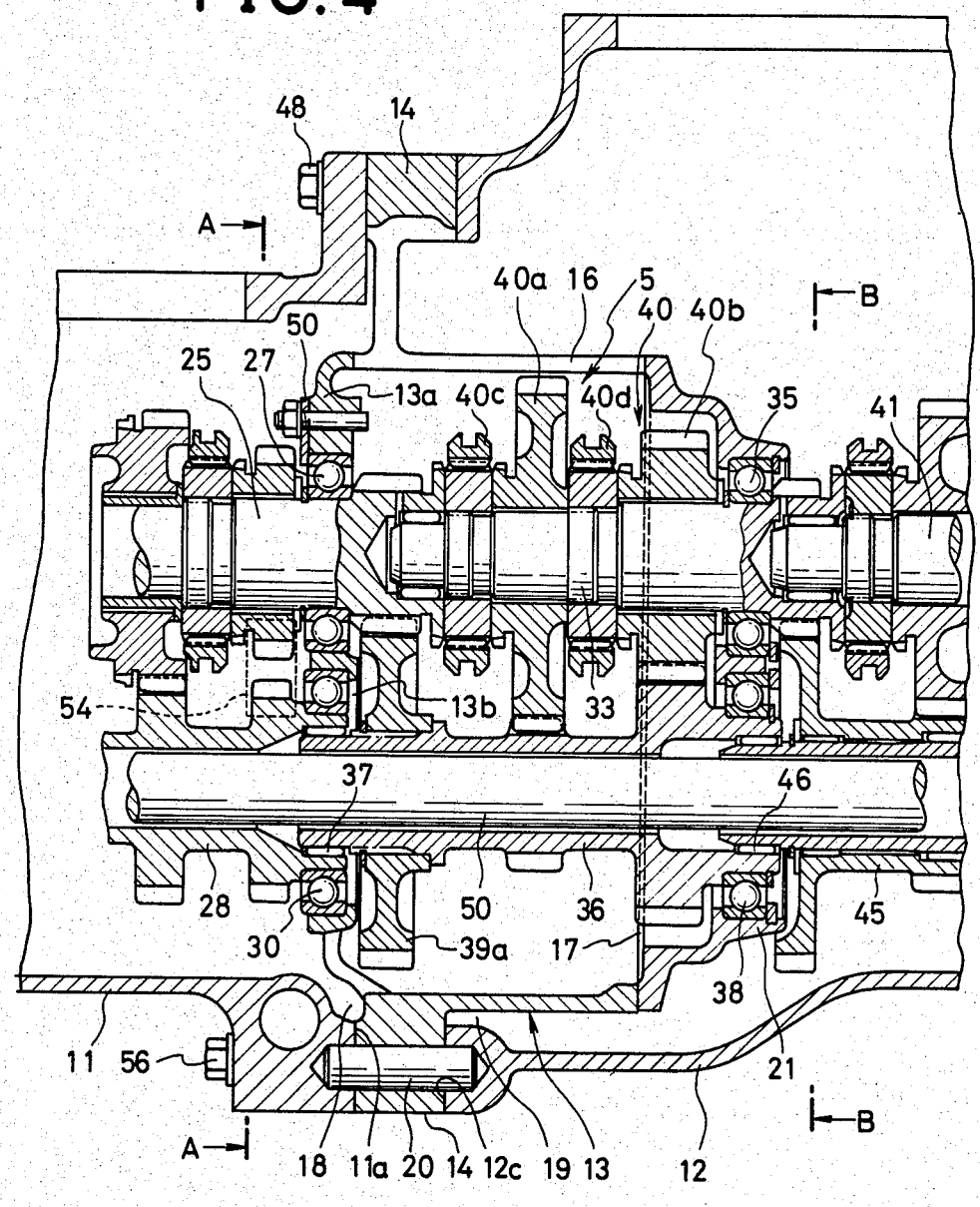
FIG. 4 is a partially enlarged cross sectional view of the transmission case as illustrated in FIG. 3.
Figure 5:
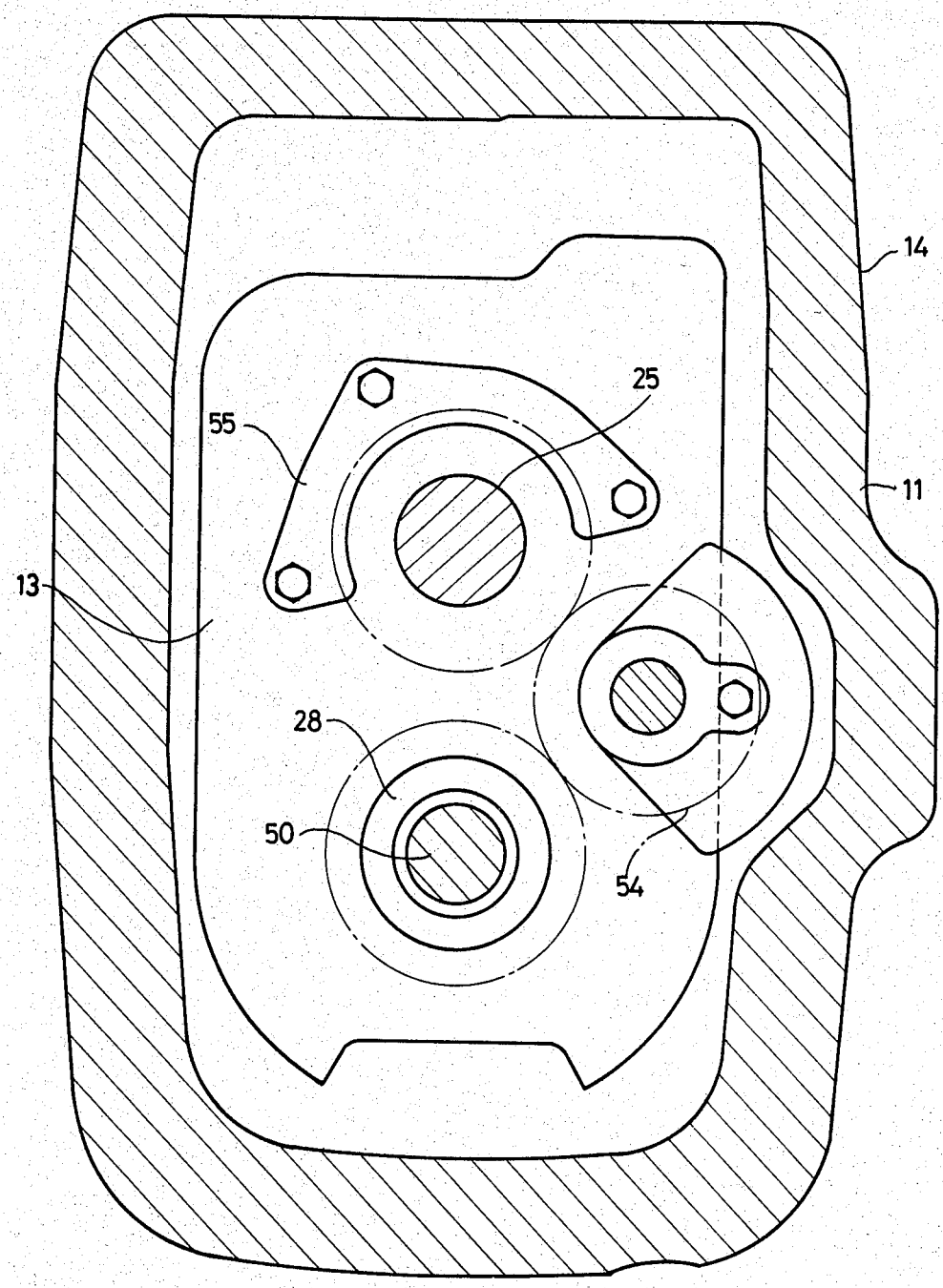
FIG. 5 is a cross-sectional view taken along the line A—A of FIG. 4.
Figure 6:
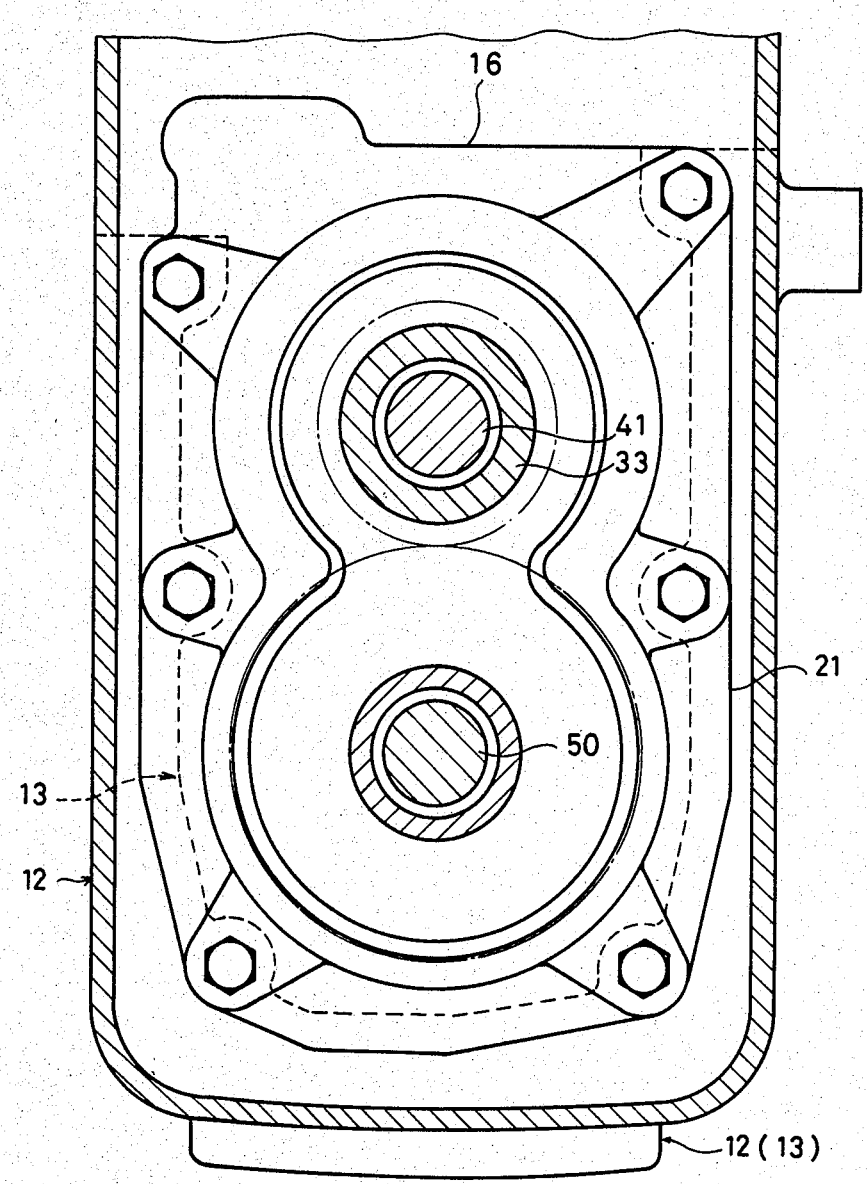
FIG. 6 is a cross-sectional view taken along the line B—B of FIG. 4.

The present invention will now be explained taking one embodiment as an example with reference to the accompanying drawings. FIG. 4 illustrates a side cross section of the spacer transmission case of this invention and FIG. 6 provides a cross-sectional view as seen from the rear. As shown in these figures, the spacer transmission case 13 has an opening 16 formed at the ceiling, a rear opening 17 at the rear end and a flange 14 formed around the periphery of the case with the flange held between the rear end 11a of the front transmission case 11 and the front end 12c of the rear transmission case 12. The correct position of the spacer transmission case is determined by the knock pin 20. In this way the hollow spacer transmission case 13 is installed inside the front and rear transmission cases 11 and 12.

Figure 1:
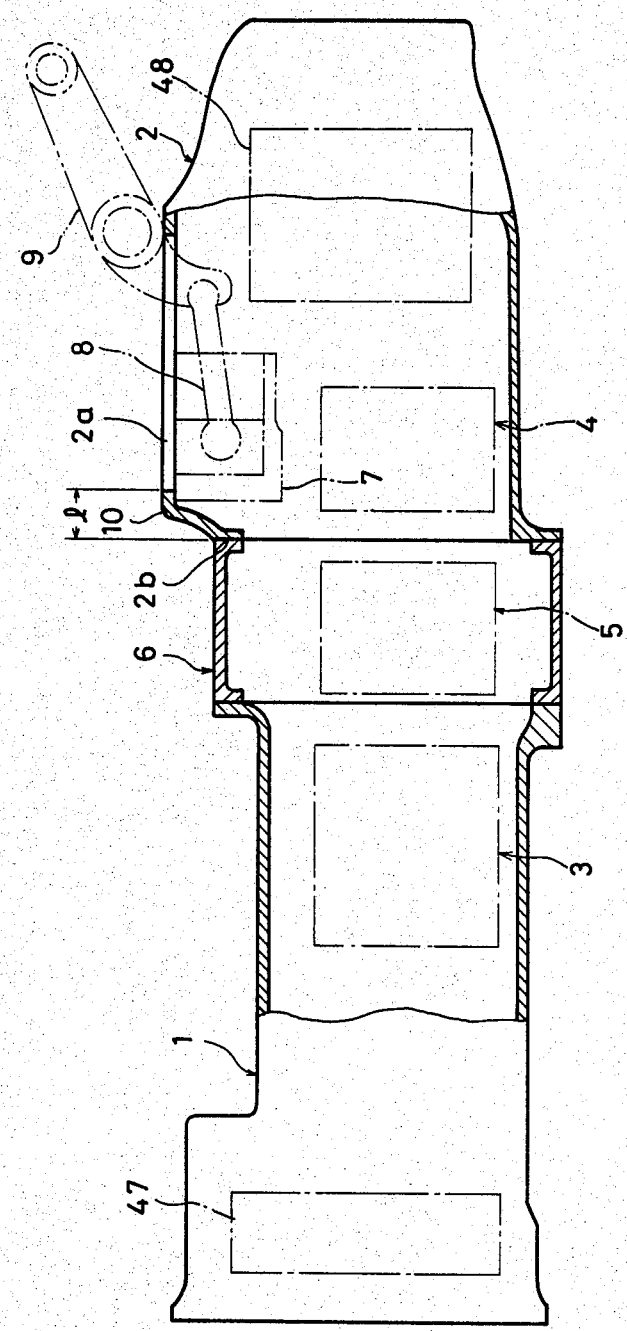
FIG. 1 is a side view, partially cut away, of a conventional transmission case.
Figure 2:
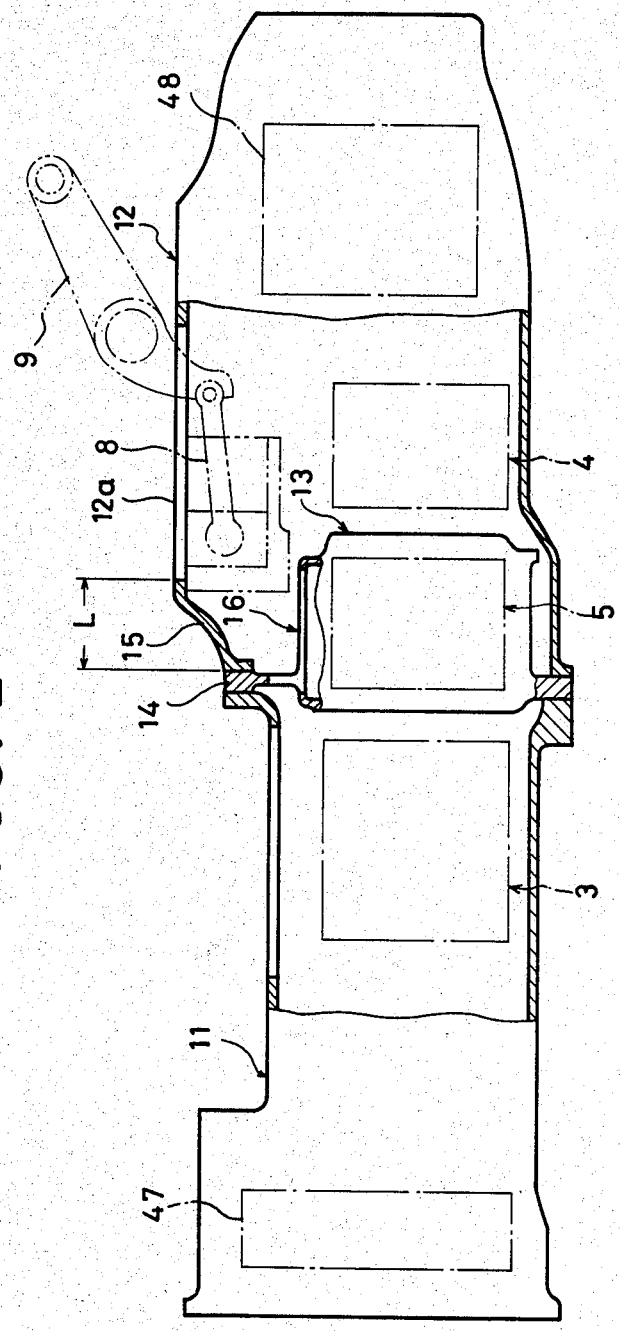
FIG. 2 is a side view, partially cut away, of a transmission case of this invention.
Figure 2A:
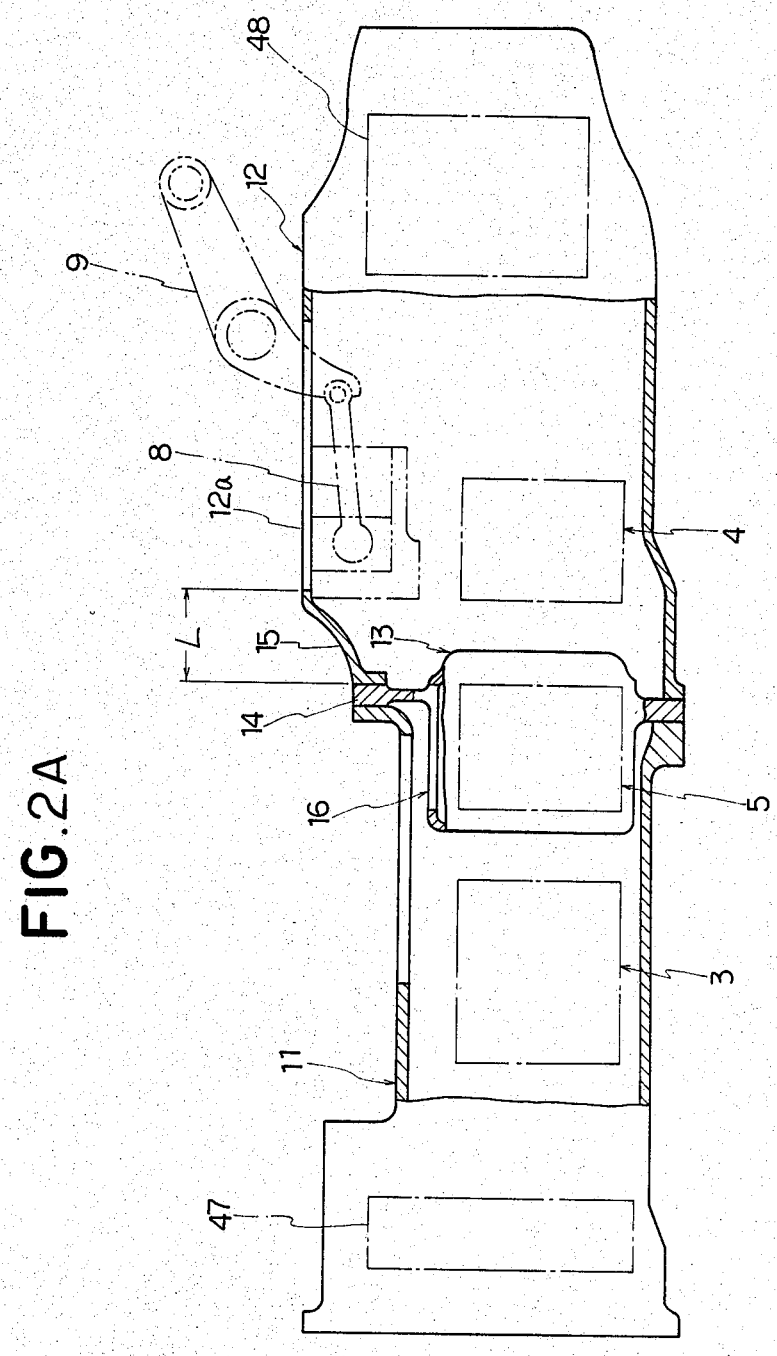
FIG. 2A is a side view similar to that of FIG. 2 showing a midified form of a transmission case embodying the present invention.
Figure 2B:
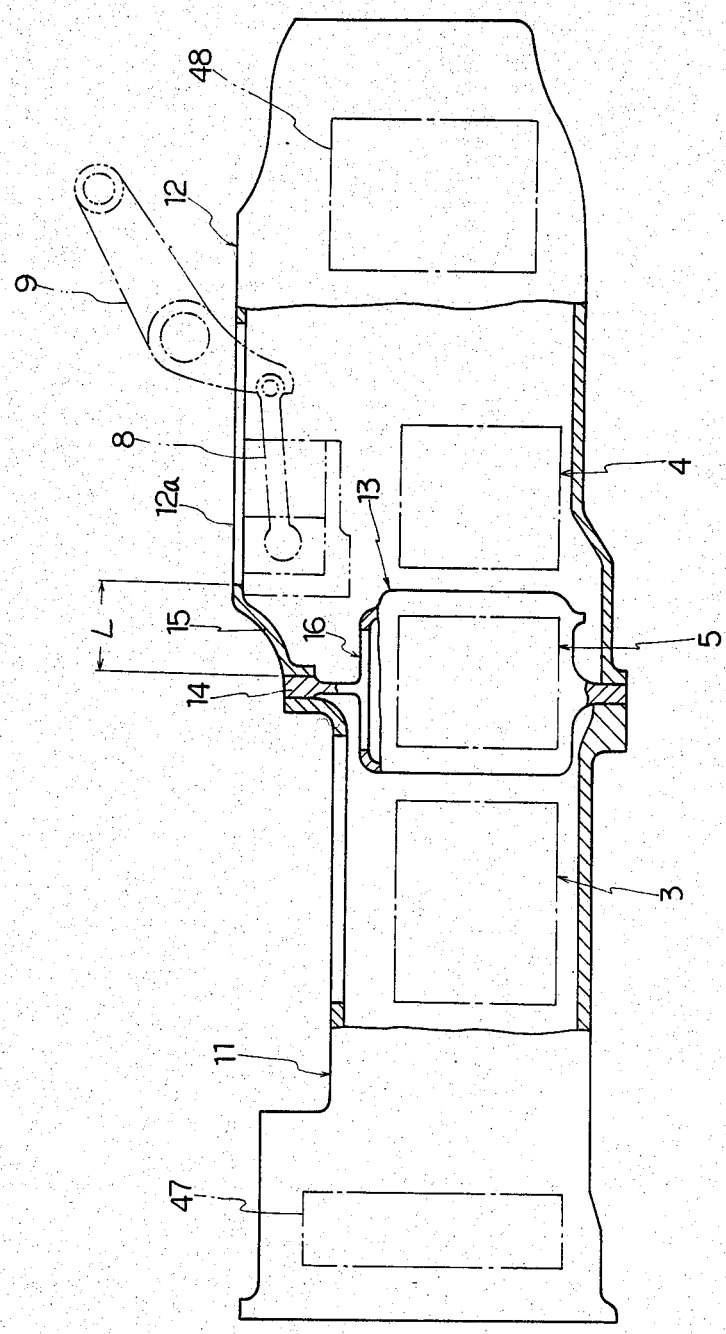
FIG. 2B is a side view similar to that of FIG. 2 showing a further modified form of a transmission case embodying the present invention.
Figure 3:
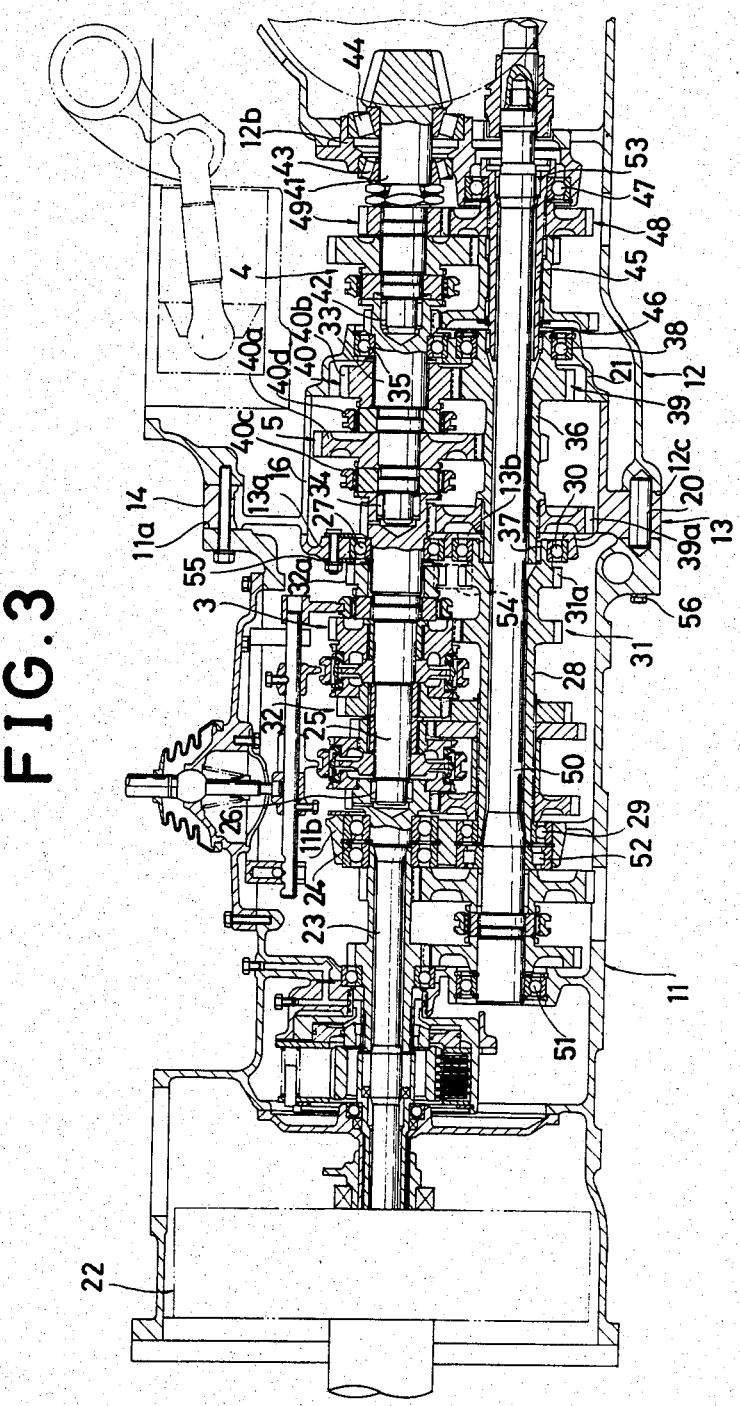
FIG. 3 is a longitudinal cross sectional view of the main portion of the transmission case of this invention.

The input shaft 23 driven by the engine, not shown, through the main clutch of FIG. 3 has its rear end rotatably supported by bearing 24 at the partition wall 11b of the front transmission case 11. The first transmission shaft 25 of the first speed change gear 3 has its front portion supported behind the input shaft 23 by the bearing 26 and its rear portion supported by the bearing 27 at the front wall 13a of the spacer transmission case 13. The first countershaft 28 has its front end supported by bearing 29 at the partition wall 11b and its rear end by bearing 30 at the front wall 13a of the spacer transmission case 13. A first counter gear train 31 on the first countershaft 28 is in mesh with a gear train 32 on the first transmission shaft 25 to form the first speed change gear 3.

For the second speed change gear 5 installed in the spacer transmission case 13, the second transmission shaft 33 has its front end supported by bearing 34 at the rear end of the first transmission shaft 25 and its rear end supported by bearing 35 at the rear cover 21. The second countershaft 36 has its front end supported by bearing 37 at the rear end of the first countershaft 28 and its rear end supported by bearing 38 at the rear cover 21. The second countergear train 39 mounted on the second countershaft 36 is meshed with the gear train on the second transmission gear 33 to form the second speed change gear 5.

A drive pinion shaft 41 that drives rear wheels has its front end supported immediately behind the second transmission shaft 33 by bearing 42 and its rear end supported by bearings 43, 44 at the partition wall 12b of the rear transmissison case 12. A third countershaft 45 has its front end supported immediately behind the second countershaft 36 by bearing 46 and its rear end supported by bearing 47 at the partition wall 12b. The gear train 48 on the third countershaft 45 is in mesh with the gear train 49 on the drive pinion shaft 41 to form the third speed change gear mounted inside the rear transmission case 12.

Designated 50 is a PTO drive shaft which is supported by bearings 51 and 52 in the front transmission case 11 and supported in the third countershaft 45 by bearing 53. Denoted 54 is a back countergear supported in the front wall 13a which is in mesh both with a gear 32a of the first gear train 32 and with a counter gear 31a of the first countergear train 31. Reference numeral 55 signifies a retainer plate for bearing 27.

In the embodiment shown, the reversing mechanism including back countergear 54 mounted behind the front transmission case 11 may be installed in the spacer transmission case 13 replacing the second speed change gear 5.

While the above-mentioned speed change gears 3 and 4 employ a continuous meshing method, other meshing system may be used.

The procedure for assembling these speed change gears 3, 4 and 5 is explained in the following. First, the second countershaft 36 is rotatably supported in the rear cover 21 by bearing 38 and the second transmission shaft 33 is supported by the bearing 35. Then, the front end of the PTO drive shaft 50 is supported by bearings 51, 52 in the front transmission case 11, and rear ends of the first transmission shaft 25 and the first countershaft 28 are rotatably supported on the front wall 13a of the spacer transmission case 13. The PTO drive shaft 50 is inserted from the rear into the first countershaft 28 with the front end of the first counter shaft 28 supported on the partition wall 11b and with the front end of the first transmission shaft 25 supported in the input shaft 23. The PTO drive shaft 50 is received into the opening 13b of the front wall 13a so that the counter gear 39a which was placed in the spacer transmission case 13 through the upper opening 16 will be sleeved over the PTO drive shaft 50. The rear end of the first transmission shaft 25 is supported on the front wall 13a of the space transmission case 13 and the flange 14 is placed in contact with the rear end 11a of the front transmission case 11.

Next, the second countershaft 36 is sleeved over the rear portion of the PTO drive shaft 50 with the second transmission shaft 33 entering the spacer transmission case 13. At this time the counter gear 39a is mounted on the second countershaft 36. Similarly, gears 40a and 40b of the second transmission gear train 40 and the slide couplings 40c and 40d are placed, through the upper opening 16, into the spacer transmission case 13 where they are mounted on the second transmission shaft 33. After this, the front end of the second counter shaft 36 is supported by bearing 37 at the rear end of the first counter shaft 28 while the front end of the second transmission shaft 33 is supported by bearing 34 at the rear end of the first transmission shaft 25. The rear cover 21 is then held against the rear end of the spacer transmission case 13 and they are bolted together.

Then, the rear ends of the drive pinion shaft 41 and the third counter shaft 45 are supported on the rear transmission case. The third transmission gear train 49 and the third countergear train 48 are mounted on these shafts, after which the front opening 12c of the rear transmission case 12 is fitted over the spacer transmission case 13. The relative position of the spacer and rear transmission cases is adjusted by the knock pin 20 and then the front end 12c of the rear case 12 and the rear end 11a of the front case 11 are held against the flange 14 of the spacer transmission case 13 and they are bolted together. Now the assembling work is completed.

As can be seen from the foregoing, since the transmission case of this invention is constructed such that the mounting flange 14 formed around the outer periphery of the spacer transmission case 13 is held between the front and rear transmission cases 11 and 12 and that the spacer transmission case 13 is contained in either one or both of the front and rear transmission cases 11 and 12, the total length of the transmission case will remain almost the same whether it requires only two speed change gears or three speed change gears, that is, whether it requires the spacer transmission or not. This construction enables standardization of the transmission case regardless of the number of speed change gears required and makes the entire length of the transmission case short as compared to the conventional ones. Because the transmission size will not increase when the spacer transmission case is interposed between the front and rear transmission cases, there is no need to shorten the rear transmission 12, which in turn insures sufficient space for the recess 2a for accommodating the hydraulic cylinder assembly and sufficient length L of the mounting portion 15. This results in higher mechanical strength at the junctions of these component transmission cases.

Furthermore, the present invention provides an opening 16 at the ceiling of the spacer transmission case 13 so that the component members of the second speed change gear 5, such as counter gear 39a, transmission gears 40a and 40b and slide couplings 40c and 40d, can easily be inserted into the case for assembling onto the rotating shaft of the speed chage gear. Moreover, this opening 16 at the top of the spacer transmission case provides an easy access to the gears mounted on the second countershaft 36 and the second transmission shaft 33 for adjustment and check.

Since the front wall 13a of the spacer transmission case 13 that supports the second countershaft 36 and the second transmission shaft 33 does not have large openings with only the large opening 16 formed in the ceiling that do not sustain any shaft, there is no possibility of reduction in the shaft bearing strength.

What is claimed is:

1. A transmission assembly for use in a vehicle comprising a front transmission case and a rear transmission case, a first speed change gear means disposed within said front transmission case, and a third speed change gear means is disposed with said rear transmission case, said front and rear transmission cases having an open end adapted to be contiguously disposed in the assembled position, and a spacer transmission case, said spacer transmission case having a laterally circumscribing flange extending outwardly therefrom, components defining a second speed change gear means disposed in said spacer transmission case, said flange of said spacer transmission case being disposed between the open ends of said front and rear transmission cases, whereby said spacer case is disposed wholly within the assembled front and rear transmission cases, and means for securing said front and rear transmission cases to said flange in the assembled position of said transmission cases.

2. A transmission case for tractors as defined in claim 1, wherein the spacer transmission has an opening in the ceiling to allow the component members of the second speed change gear to be inserted through the opening for assembling onto the rotating shaft of the speed change gear.

3. A transmission assembly as defined in claim 1 wherein said flange extends radially outwardly of said spacer transmission case about a medial portion thereof.

4. A transmission assembly as defined in claim 1 wherein said flange extends radially outwardly of said spacer transmission case adjacent one end of said spacer transmission case.

5. A transmission assembly as defined in claim 1 wherein said front, rear and spacer transmission cases are co-axially disposed relative with one another, and said spacer transmission case being disposed within said front and rear transmission cases.

6. A transmission assembly as defined in claim 1 wherein each of said first, second and third speed change gear means includes a transmission shaft, and said respective transmission shafts being co-axially disposed.

* * * * *